United States Patent
Tillman

[15] 3,635,436
[45] Jan. 18, 1972

[54] STRAIGHT-THROUGH FLOW VALVE WITH RESTRICTING SEALS

[72] Inventor: Alfred Tillman, Mt. Tabor, N.J.
[73] Assignee: Marotta Scientific Controls, Inc., Boonton, N.J.
[22] Filed: Apr. 27, 1970
[21] Appl. No.: 32,223

[52] U.S. Cl. ..................251/31, 251/63, 251/159, 251/167
[51] Int. Cl. ....................................F16k 39/04
[58] Field of Search ....................251/159, 167, 63, 31

[56] References Cited

UNITED STATES PATENTS

| | | | |
|---|---|---|---|
| 3,036,807 | 5/1962 | Lucky et al. | 251/63 X |
| 3,110,470 | 11/1963 | Dumm | 251/159 |
| 3,159,378 | 12/1964 | Haag | 251/63 X |
| 2,176,594 | 10/1939 | Nordstrom | 251/63 X |

*Primary Examiner*—Arnold Rosenthal
*Attorney*—Sandoe, Hopgood & calimafde

[57] ABSTRACT

This flow straight-through valve has a valve element with piston heads at both ends which slide in a cylindrical valve chamber. A transverse opening through the valve element, between the piston heads, is moved into alignment with inlet and outlet passages on opposite sides of the cylindrical valve chamber to open the valve. The transverse opening is of the same cross section as the inlet and outlet passages. The valve element has slabbed-off flat surfaces on the sides that confront the inlet and outlet passages. Moveable seals are resiliently urged toward the flat surfaces, and fluid pressure means, which move the valve element between open and closed positions, cause the seals to move away from the valve element, and thus unseal it, when the fluid pressure is applied to move the valve element.

11 Claims, 4 Drawing Figures

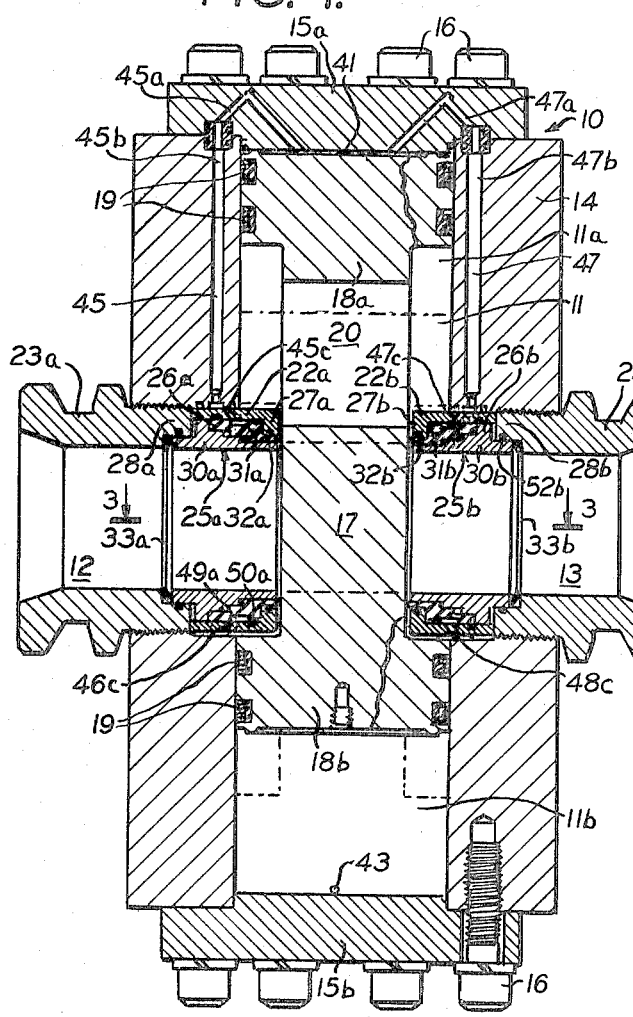
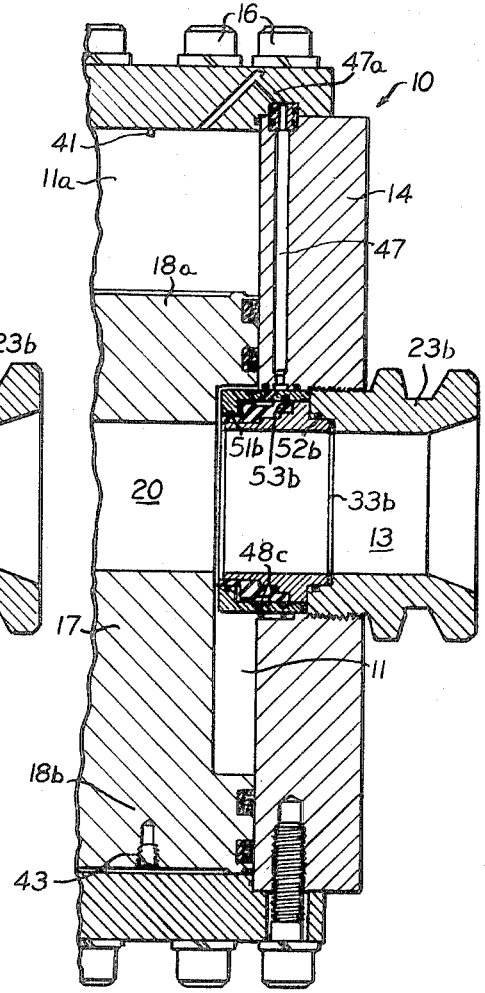
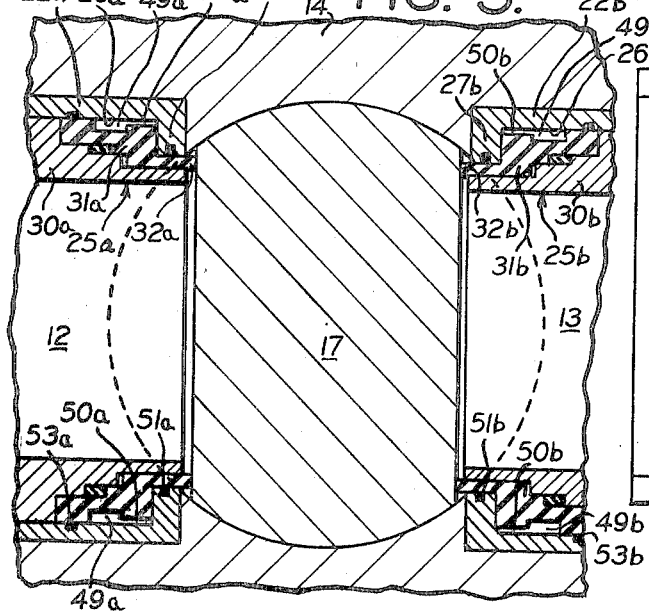
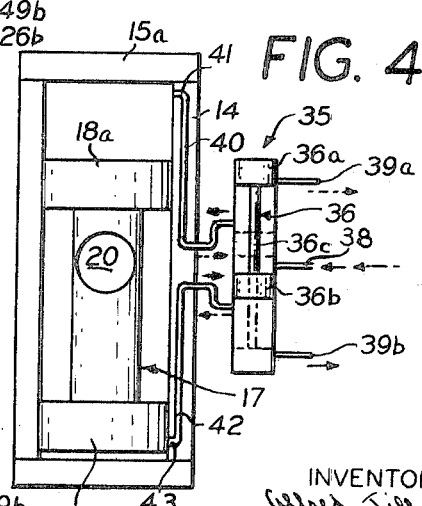

STRAIGHT-THROUGH FLOW VALVE WITH RESTRICTING SEALS

The present invention is a full flow straight-through valve with improved sealing means.

BACKGROUND OF THE INVENTION

The valve of this invention is a type in which the flow passage is straight through it and in which a valve element operating as a gate is slidably mounted to move into and out of the passage, usually at right angles thereto, for opening and closing the passage. It has been a problem to provide adequate seals to prevent leakage around the gate elements of such valves. Seals are customarily mounted in place between surfaces of the gate element and the body of the valve so that movement of the gate element relative to the valve body quickly wears the seals down so that they leak.

OBJECTS OF THE INVENTION

A principal object of this invention is to provide a straight through valve of the above type in which main seals are provided to be in resilient engagement with the gate element for preventing leakage around the gate, but in which the main seals are moved out of engagement with the gate element when it is moved either to open or closed position. Thus, the main seals are not subjected to the frictional wear encountered with known gate valves of the foregoing type; consequently, the seals provide more effective sealing and last much longer.

Another object is to provide a straight through valve in which the main seals are movable as aforesaid and in which other seals are located in the valve to restrict leakage into the interior of the valve when the main seals are moved out of engagement with the gate element.

Still another object is to provide a valve as aforesaid in which the means applied for moving the gate element between its open and closed positions applies simultaneously for moving the main seals out of engagement with the gate element.

BRIEF DESCRIPTION OF THE INVENTION

The valve of this invention comprises generally a valve body having a cylindrical valve chamber therein with an inlet and an outlet passage opening into the chamber respectively through opposite walls to provide a straight-through passage. A valve element or gate with piston heads at its ends is slidable in the chamber and has a transverse opening through it between the piston heads for alignment with the inlet and outlet passages in one longitudinal position of the valve element for opening the valve.

Annular seal units are mounted in annular recesses in the walls of the inlet and outlet passages, respectively, and are slidable axially in the recesses toward and away from the valve element in the chamber. A flange portion of each of the seal units extends out over an end wall of its recess into the chamber for engaging, and making sealing contact with the adjacent flat surface of the valve element in the chamber when the respective seal unit is moved toward the valve element. Resilient means, such as axially resilient spring washers in the annular recesses, normally urge the seal units into sealing engagement with the valve element.

The valve element is moved back and forth within the valve chamber to open and close the valve by fluid, a liquid or a gas, introduced under pressure into one or the other of the end portions of the chamber, between the end of the chamber and the piston head adjacent thereto, while permitting fluid to exhaust from the opposite end portion of the chamber.

Conduits for fluid in the body of the valve extend from one end portion of the chamber to the recesses, in which the seal units are mounted, opening into the recesses between the ends of the recesses that are toward the valve chamber and the adjacent ends of the seal units. Thus, when fluid under pressure is fed into the conduit connected end portion of the chamber for moving the valve element, fluid pressure applies through the latter conduits and moves the seal units laterally in the recesses, against the pressure of the resilient means, in directions in which their flange portion move away from the valve element, unsealing it. When the fluid pressure is relieved, as by cutting off the application of the fluid when the valve element reaches closed or opened position, the resilient means are again operative to push the seal units back into sealing position.

As mentioned above, when fluid is fed under pressure into one end of the valve chamber for moving the valve element toward the other end, fluid is permitted to exhaust from the other end. This other end of the valve chamber does not have conduits between it and the recesses, comparable to the aforementioned conduits from the one end. When pressure is applied in this other end to move the valve element to the one end, the restricted cross section of the inlet-outlet opening into the one end creates back pressure on the escaping fluid which builds up pressure in the seal unit recesses to move the seal units back against the pressure of the resilient means. When the valve element stops, the back pressure escapes and the resilient means push the seal units back into sealing position.

There are seal rings around the piston heads bearing against the walls of the valve chamber and seal rings around the flange portions and body portions of the main seal units bearing against the walls of the recesses at opposite sides of the end portions of the recesses into which fluid flows for moving the seals. These seal rings serve to prevent the escape of fluid from the ends of the valve chamber or from the seal unit recesses, except through the conduits, and also provide supplemental seals to prevent leakage from the valve when the main seal units are moved out of engagement with the valve element as fluid pressure is applied to shift the position of the valve element.

BRIEF DESCRIPTION OF THE DRAWINGS

Further objects, advantages and features of the invention will be apparent from the following detailed description of an illustrative embodiment shown in the accompanying drawings in which:

FIG. 1 is a cross-sectional view axially through a valve of this invention, in closed position;

FIG. 2 is a cross-sectional partial view similar to the view in FIG. 1, but showing the valve element in the open position and the main seal unit in unsealed position;

FIG. 3 is a sectional view on an enlarged scale along the line 3—3 of FIG. 1; and FIG. 4 is a reduced cross-sectional view through the valve of FIG. 1, at right angles to the view of FIG. 1, and showing schematically a double-acting control valve for directing fluid under pressure to one end of the valve chamber of the main valve while opening the other end of the valve chamber for fluid to exhaust therefrom.

DETAILED DESCRIPTION OF THE INVENTION

Referring to the drawings, a valve of this invention has a body member 10 having an elongated cylindrical valve chamber 11 therein with an inlet passage 12 and an outlet passage 13 opening into the central portion of the valve chamber through opposite sides thereof in alignment with each other to provide a straight flow path through the valve. The body member 10 is suitably provided by a tubular shell 14 having caps 15a and 15b fastened respectively over its opposite ends by bolts 16. The inlet and outlet openings 12 and 13 are suitably provided by inner bushings 22a and 22b fitted into opposed openings in the wall of the shell 14 and held therein by outer bushings 23a and 23b threaded into the outer end portions of the openings.

An elongated valve element 17 with cylindrical piston heads 18a and 18b at opposite ends is longitudinally slidable in the valve chamber 11. Seal rings 19 mounted in suitable annular grooves in the piston heads 18a and 18b bear against the wall of the valve chamber 11 to provide sliding seals between the piston heads and the adjacent wall.

The central portion of the valve element 17, between its piston heads 18a and 18b, has opposite sides slabbed off to present flat sides confronting the inner ends of the inner bushings 22a and 22b which define the openings of the inlet and outlet passages 12 and 13 into the valve chamber. A transverse opening 20 is provided through the central portion of the valve element, nearer one of the piston heads than the other, to be moved into alignment with the inlet and outlet passages 12 and 13, and thus open the valve, when the valve element is moved toward one end of the valve chamber 11 to the position illustrated in FIG. 2. When the valve element is moved to the lower end of the valve chamber, to the position illustrated in FIG. 1, a solid portion of the valve element blocks both the inlet and outlet to close the valve.

In a preferred form of the valve, as shown, the diameters of the valve inlet and outlet passages 12 and 13 and of the opening 20 through the valve element are all the same so as to provide full flow through the valve.

A pair of annular seal units 25a and 25b are mounted respectively in annular recesses 26a and 26b in the walls of the inlet and outlet passages 12 and 13, respectively, to slide axially in the recesses toward and away from the valve element 17. As shown, the recesses 26a and 26b, in cross section, have relatively deep elongated central portions and shallower shoulder portions at their ends, being formed by the L-shaped inner bushings 22a and 22b arranged with the feet of the L's forming inner end walls 27a and 27b of the recesses and the ends of the legs of the L's butting against inner stepped edges 28a and 28b of the outer bushings 23a and 23b.

The seal units 25a, 25b consist respectively of support rings 30a, 30b, with seal rings 31a, 31b, of suitably resilient seal material, such as nylon or Teflon, Delrin, Vespel, or Kel-F synthetic resin materials or the like, mounted on the support rings in outer annular undercut stepped portions thereof, extending to the ends of the support rings which face the valve chamber. In cross section the seal units 25a, 25b correspond to the shape of the recesses 26a, 26b but are shorter than the recesses in order to move axially back and forth therein, toward and away from the valve element in the chamber 11. The ends of the seal rings 31a, 31b that are toward the chamber 11 are stepped, having flange portions 32a, 32b which extend over the end walls 27a, 27b of the recesses and into the chamber 11, beyond the ends of the support rings to engage the flat side surface of the valve element 17 when the seal units 25a and 25b are moved inward toward it.

Laterally resilient spring washers 33a and 33b are mounted respectively in the outward ends of the recesses 26a and 26b that are formed by the inner ends of the outer bushings 23a and 23b, between the ends of the recess and the outward ends of the support rings 30a and 30b of the seal units 25a and 25b so as to urge the seal units 25a and 25b toward the chamber 11 and thereby press the seal ring flange portions 32a and 32b of the seal units into resilient sealing engagement with the valve element 17. When the valve element is moved in the valve chamber 11, from open to closed or from closed to open position, of the valve, the seal units 25a and 25b are both moved back in the respective recesses 26a and 26b against the tension of the spring washers 33a and 33b to withdraw the seal ring flange portions 32a and 32b from sealing engagement with the valve element 17. This unsealing movement of the seal units 25a and 25b and the movement of the valve element 17 are coordinated and are accomplished by fluid pressure in the manner described below.

As illustrated in FIG. 4, fluid, such as air or a hydraulic fluid, under pressure from a conventional source (not shown) is directed by a double-acting control valve 35 alternatively into one or the other of the end portions 11a and 11b of the valve chamber 11, while permitting fluid to exhaust from the opposite end portion, for moving the valve element 17 back and forth in the valve chamber to open and close the valve. The control valve 35 which may be of any suitable conventional type, as shown, consists of a piston 36 having piston heads 36a and 36b at opposite ends of a smaller diameter shaft 36c and being slidable back and forth in a cylinder 37 by suitable means; for example, the valve 35 could be a solenoid valve, the piston 36 being the movable core thereof, or the piston could be moved by means of an extension thereof, or a projection therefrom, extending out through the wall of the cylinder 37. The cylinder 37 has an inlet tube 38 opening into the central portion thereof between the piston heads 36a, 36b through which fluid under pressure from a suitable source is fed into the cylinder. A pair of outlet tubes 39a and 39b are connected respectively into opposite end portions of the cylinder for fluid to escape from one or the other of the end portions depending upon the position of the piston 36. A fluid flow conduit 40 from the cylinder 37, and through the shell 14 of the main valve, connects the upper end portion of the cylinder 37 to the upper end portion 11a of the valve chamber 11 through a port 41; another fluid flow conduit 42 from the cylinder, and through the shell 14, connects the lower end portion of the cylinder 37 to the lower end portion 11b of the valve chamber 11 through a port 43.

As seen in FIG. 4 the dimensions of the piston 36 and the location of the inlet tube 38 are such that fluid will flow into the cylinder through inlet tube 38 in any position of the piston 36. The positions of the openings of the outlet tubes 39a and 39b and the conduits 40 and 42 into the cylinder 37 in relation to the length of the piston 36 are such that when the piston is moved to the upper end of the cylinder 37, the outlet tube 30a is blocked by the piston head 36a and fluid entering the cylinder under pressure through inlet tube 38 is free to flow between the piston heads 36a, 36b into the conduit 40 to enter the upper end portion 11a of the valve chamber 11 and apply pressure to move the valve element 17 downward therein to the open position of the main valve illustrated in FIGS. 2 and 4. At the same time, with the piston 36 of control valve 35 in this upward position, the piston 36 is above the openings of the conduit 42 and the outlet tube 39b into the lower end portion of the cylinder 37. Thus, fluid is free to exhaust from the lower end portion 11b of the main valve chamber 11 through the conduit 42 to the lower end portion of the cylinder 37 and then out through the outer conduit 39b, thereby to relieve pressure at the lower end of the valve element 17 and permit its downward movement.

When the piston 36 is subsequently moved to the lower end of the cylinder 37, (to its dash line position) the fluid flow is reversed, feeding pressure into the lower end portion 11b of the valve chamber 11 to move the valve element 17 upward to the closed position of the main valve shown in FIG. 1 and at the same time permitting fluid in the upper end portion 11a to exhaust therefrom through conduit 40, through the upper end portion of the cylinder 37 and then out the outlet tube 39a.

When fluid pressure is applied to the upper end of the valve chamber 11 to move the valve element 17 down for opening the valve, it is simultaneously applied to move the seal units 25a and 25b back in the recesses 26a and 26b and out of sealing contact with the valve element. For this purpose, in the upper left portion of the valve body member 10 a conduit 45 connects the upper end portion 11a of the valve chamber with the recess 26a in which the seal unit 25a is received. The conduit 45 consists of a conduit 45a drilled in the cap 15a connecting with a conduit 45b drilled through the shell 14 to connect with a conduit 45c through the upper side of inner bushings 22a.

On the right side of the valve, a conduit 47, in the upper portion of the body member, connects the upper end portion 11a of the valve chamber with the recess 26b in which the seal unit 25b is received. The conduit 47 is formed by the connecting conduits 47a, 47b and 47c, respectively, through the cap 15a, the shell 14 and the upper side of the inner bushing 22b.

The seal rings 31a and 31b of the seal units 25a and 25b have annular grooves 49a and 49b, respectively, around their outer surfaces adjacent the openings of the conduits 45c and 47c, respectively, through the bushings 22a and 22b into the recesses 26a and 26b, and lateral grooves 50a and 50b (FIG. 3), which are also in the outer surfaces of the respective seal rings 31a and 31b. These grooves 50a and 50b extend from the annular grooves 49a and 49b to the ends of the seal rings that are toward the center of the valve, adjacent the end walls 27a and 27b of the recesses 26a and 26b. The annular grooves 49a and 49b and the lateral grooves 50a and 50b thus provide flow paths to conduct fluid under pressure that enters the recesses from either the conducts 45c and 47c (from the upper portion of the valve) to the ends of the recesses at their end walls 27a and 27b so that the fluid thus applies to push both of the seal units 25a and 25b back in the recesses, against the pressure of the spring washers 33a and 33b and thereby withdraw the flange portions 32a and 32b of the seal rings 31a and 31b from sealing contact with the valve element 17.

As shown the recesses 26a and 26b have seal rings 51a and 51b (FIG. 3), 52a and 52b (FIGS. 1 and 2) and 53a and 53b (FIG. 3) seated therein at the opposite end portions and at the central portion, at the side of the openings of the conduits 45c and 47c, toward the outward ends of the recesses, which are the ends away from the valve chamber 11. These seal rings assist the sliding movement of the seal units 25a and 25b in the recesses and prevent fluid, introduced into the recesses under pressure, from escaping around the ends of the seal units.

When fluid under pressure is introduced into the bottom end portion 11b of the valve chamber, the valve element 17, moves up. Port 41 restricts flow of fluid from end portion 11a to build up pressure in end portion 11a and this pressure is transmitted through conduits 45 and 47 and conduits 45c and 47c to recesses 26a and 26b to move the sealing units 25a and 25b back to the unsealed positions.

Thus, when the valve element 17 is moving under the pressure of fluid applied as above for opening and closing the valve, the seal units 25a and 25b are withdrawn from frictional engagement with the valve element which reduces substantially the wear on the seal rings 31a and 31b of the seal units that would otherwise occur. This of course preserves the seal rings 31a, and 31b, and also provides uniformly good sealing during the service life of these seal rings.

When the valve element 17 reaches the upper position in the chamber 11 for closing the valve, the valve element 17 stops moving and the back pressure in end chamber 11a drops. The pressure of fluid in seal unit recesses 26a and 26b is then relieved by the escape of fluid through the conduits to the end portion 11a which is open through the control valve 35 for fluid to exhaust therefrom and the seal units 25a and 25b move forward into sealing position again under the pressure of the spring washers 33a and 33b.

When the seal units 25a and 25b are out of sealing engagement with the valve element 17 during movement of the latter, the liquid or gas, in the flow path of which the valve is connected, can flow around the ends of the seal units into the portions of the valve chamber 11 between the piston heads 18a and 18b, but is prevented from leaking out of the valve by the seal ring 19 around the piston head. Some of the liquid or gas may be trapped in the latter position of the chamber 11 when the valve element reaches open or closed position and the seal units 25a and 25b again move to sealing position, but this trapped liquid or gas is subsequently returned to the flow path through the valve when the valve element is subsequently moved to the opposite end of the chamber and the seal units are again unsealed.

The preferred embodiment of the invention has been illustrated and described, but changes and modifications can be made and some features can be used in different combinations without departing from the invention as defined in the claims.

What is claimed is:

1. A valve comprising a body member having a valve chamber therein, inlet and outlet passages opening into the chamber, a valve element having piston heads at both ends slidable in the chamber, said valve element having a transverse opening therethrough located between the piston heads and oriented to be in alignment with said inlet and outlet passages when the valve element is in its open position, fluid pressure means for moving the valve element between open and closed positions, seals around the inlet and outlet passages movable into and out of engagement with the sides of said valve element around the opening through the valve element, resilient means urging the seals to move in one direction, and other means connected with the seals for moving them in the other direction, the valve element having flat surfaces on the sides that confront the inlet and outlet passages, and said resilient means being in position to urge the seals into engagement with the sides of the valve element.

2. The valve of claim 1 in which said other means are connected with the fluid pressure means and operate to move the seals away from the sides of the valve element when said fluid pressure means are operated to move the valve element.

3. The valve in claim 1 in which the inlet and outlet passages and the transverse opening through the valve element are all the same cross section.

4. The valve of claim 1 in which the inlet and outlet passages open into the valve chamber through diametrically opposite sides thereof and extend in directions in alignment with one another.

5. The valve of claim 4 in which the inlet and outlet passages and the transverse opening through the valve element are all the same cross section.

6. The valve of claim 1 in which said fluid pressure means comprises means for conducting fluid under pressure alternatively into opposite end portions of the chamber between the ends of the chamber and the respective piston heads facing said ends while simultaneously opening the other said opposite end portion for fluid to exhaust therefrom for sliding the valve element between its open and its closed positions in the chamber, in which said seals are annular seal units received in annular recesses in the walls of the inlet and outlet passages, respectively, to slide axially in said recesses toward and away from the valve element in the chamber, each of said seal units having an annular flange portion extending out over an end wall of its recess and into the chamber to engage the adjacent side of the valve element, and conduits for fluid between one end portion of the chamber and the end portions of said recess that are toward the chamber so that fluid under pressure applied to one of said end portions of the chamber for moving the valve element applies also to the seals and moves them in directions in which their flange portions move away from the valve element.

7. The valve of claim 6 in which said fluid pressure means comprises a first conduit for fluid opening into one end portion of the valve chamber between the end of the chamber and the piston head at that end of the chamber, a second conduit for fluid opening into the opposite end of the chamber between the latter end and the other piston head, means selectively operable to connect one of said conduits to a source of fluid under pressure for moving the valve element in one direction while simultaneously opening the other of said conduits for fluid to exhaust therefrom and alternatively to reverse the connection.

8. The valve of claim 6 in which said conduits for fluid between the opposite end portions of the chamber and said fluid pressure means are each substantially the same length and diameter.

9. The valve of claim 6 including seal rings around the flange portions of the seal units respectively between said flange portions and the inlet and outlet passage walls adjacent thereto for effecting seals around the flanges between the valve chamber and the end portions of the recesses into which fluid flows from the conduits from the end portion of the chamber.

10. The valve of claim 8 including additional seal rings around the seal units between the seal units and the adjacent walls of the recesses in the area between the portions of the recesses into which said fluid flows and the ends of the seal units that are opposite the flanged ends thereof, for preventing said fluid from flowing around the ends of the seal units opposite said flanged walls.

11. The valve of claim 1 including seal rings surrounding said piston heads effecting seals between the walls of the piston heads and the adjacent walls of the valve chamber.